US006389668B1

(12) United States Patent
Hwang

(10) Patent No.: US 6,389,668 B1
(45) Date of Patent: May 21, 2002

(54) TOOL KIT FOR MOUNTING/DETACHING AN IRON SLEEVE TO/FROM A CHASSIS

(76) Inventor: Cherng-Bin Hwang, P.O. Box 63-247, Taichung (TW)

( * ) Notice: Subject to any disclaimer, the term of this patent is extended or adjusted under 35 U.S.C. 154(b) by 0 days.

(21) Appl. No.: 09/664,672

(22) Filed: Sep. 19, 2000

(51) Int. Cl.[7] .................................................. B23P 19/04
(52) U.S. Cl. .......................................................... 29/263
(58) Field of Search ............................ 29/263–265, 256

(56) References Cited

U.S. PATENT DOCUMENTS

| | | | | | |
|---|---|---|---|---|---|
| 1,465,124 | A | * | 8/1923 | Gardner | 29/263 |
| 1,589,862 | A | * | 6/1926 | Quint | 29/263 |
| 1,833,420 | A | * | 11/1931 | Haman | 29/263 |

* cited by examiner

*Primary Examiner*—Robert C. Watson
(74) *Attorney, Agent, or Firm*—Alan Kamrath; Rider, Bennett, Egan & Arundel, LLP

(57) ABSTRACT

A tool kit for a chassis includes a first pressing member for mounting an iron sleeve into a compartment of the chassis, the first pressing member having an outer diameter greater than an inner diameter of the compartment of the chassis; a second pressing member for removing the iron sleeve out of the compartment of the chassis, the second pressing member having an outer diameter smaller than the inner diameter of the compartment of the chassis; a bolt; a push-in member for mounting the iron sleeve into the compartment of the chassis; a nut; and a detaching sleeve for removing the iron sleeve out of the compartment of the chassis. When mounting the iron sleeve into the compartment of the chassis, the first pressing member is attached to a side of the chassis and the bolt is extended through the first pressing member and the compartment of the chassis with the bolt head pressing against the first pressing member. The iron sleeve and the push-in member are mounted around the shank of the bolt. The nut is mounted around the shank of the bolt and rotated to drive the push-in member to move along a longitudinal direction of the bolt, which, in turn, drives the iron sleeve into the compartment of the chassis. When removing the iron sleeve out of the compartment of the chassis, the second pressing member is attached to a side of the chassis. The bolt is extended through the second pressing member and the compartment of the chassis with the bolt head pressing against the second pressing member. The iron sleeve and the detaching sleeve are mounted around the shank of the bolt. The nut is mounted around the shank of the bolt and rotated to drive the second pressing member to move along a longitudinal direction of the bolt, which, in turn, drives the iron sleeve out of the compartment of the chassis and into the detaching sleeve.

11 Claims, 12 Drawing Sheets

TOOL KIT FOR MOUNTING/DETACHING AN IRON SLEEVE TO/FROM A CHASSIS

BACKGROUND OF THE INVENTION

1. Field of the Invention

The present invention relates to a tool kit for mounting/detaching an iron sleeve to/from a chassis of a vehicle or the like.

2. Description of the Related Art

A typical vehicle chassis includes an iron sleeve with a soft lining to prevent wear of the elements resulting from direct friction therebetween. The iron sleeve must be replaced with a new one when the lining is worn out, and the replacement is time-consuming and labor-intensive. As illustrated in FIG. 14 of the drawings, a worker often uses a hammer to hammer the iron sleeve 40' into or out of the chassis 10. A larger space is required for the arm of the worker to swing. This is difficult to operate in the limited space under the chassis 10. In addition, in order to provide a larger space for hammering, the differential 11 mounted to the chassis 10 must be removed before removing the iron sleeve 40'. This causes trouble and inconvenience. Further, the chassis 10 as well as the iron sleeve 40' might be deformed and thus damaged by hammering.

SUMMARY OF THE INVENTION

It is an object of the present invention to provide a tool kit for mounting/detaching an iron sleeve to/from a chassis without the need of detaching the differential.

In accordance with the present invention, a tool kit is provided for a chassis having a compartment defined therein for receiving an iron sleeve, the chassis including a first side and a second side, the tool kit comprising:

a first pressing member for mounting the iron sleeve into the compartment of the chassis, the first pressing member having an outer diameter greater than an inner diameter of the compartment of the chassis;

a second pressing member for removing the iron sleeve out of the compartment of the chassis, the second pressing member having an outer diameter smaller than the inner diameter of the compartment of the chassis;

a bolt including a bolt head and a shank;

a push-in member for mounting the iron sleeve into the compartment of the chassis;

a nut; and a detaching sleeve for removing the iron sleeve out of the compartment of the chassis;

wherein when mounting the iron sleeve into the compartment of the chassis, the first pressing member is attached to the first side of the chassis., the bolt is extended through the first pressing member and the compartment of the chassis with the bolt head pressing against the first pressing member, the iron sleeve and the push-in member are mounted around the shank of the bolt, and the nut is mounted around the shank of the bolt and rotated to drive the push-in member to move along a longitudinal direction of the bolt, which, in turn, drives the iron sleeve into the compartment of the chassis; and wherein when removing the iron sleeve out of the compartment of the chassis, the second pressing member is attached to the first side of the chassis, the bolt is extended through the second pressing member and the compartment of the chassis with the bolt head pressing against the second pressing member, the iron sleeve and the detaching sleeve are mounted around the shank of the bolt, and the nut is mounted around the shank of the bolt and rotated to drive the second pressing member to move along a longitudinal direction of the bolt, which, in turn, drives the iron sleeve out of the compartment of the chassis and into the detaching sleeve.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
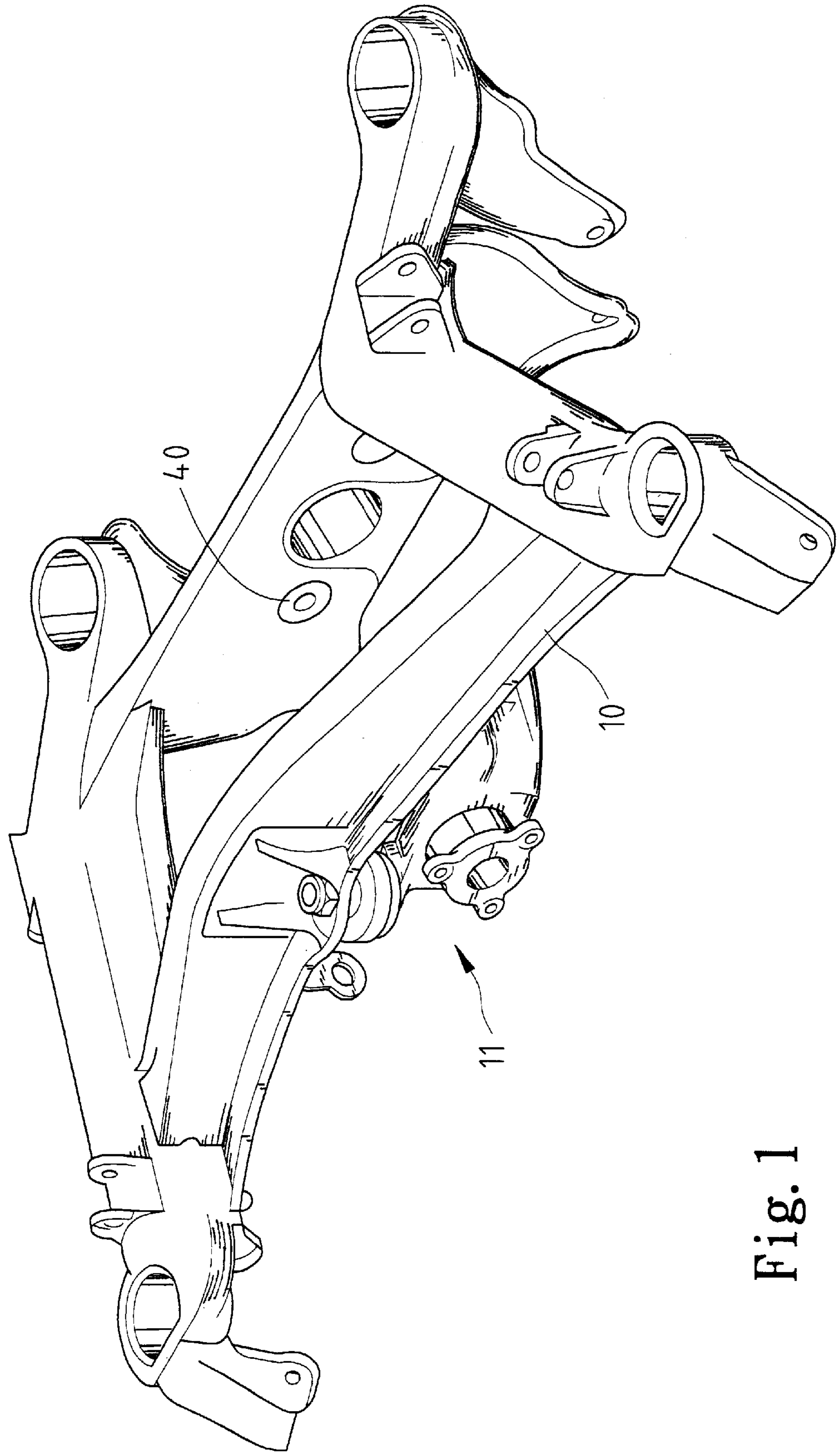
FIG. 1 is a perspective view of a chassis with a tool kit in accordance with the present invention, wherein only the elements of the tool kit for mounting an iron sleeve are shown.
Figure 2:
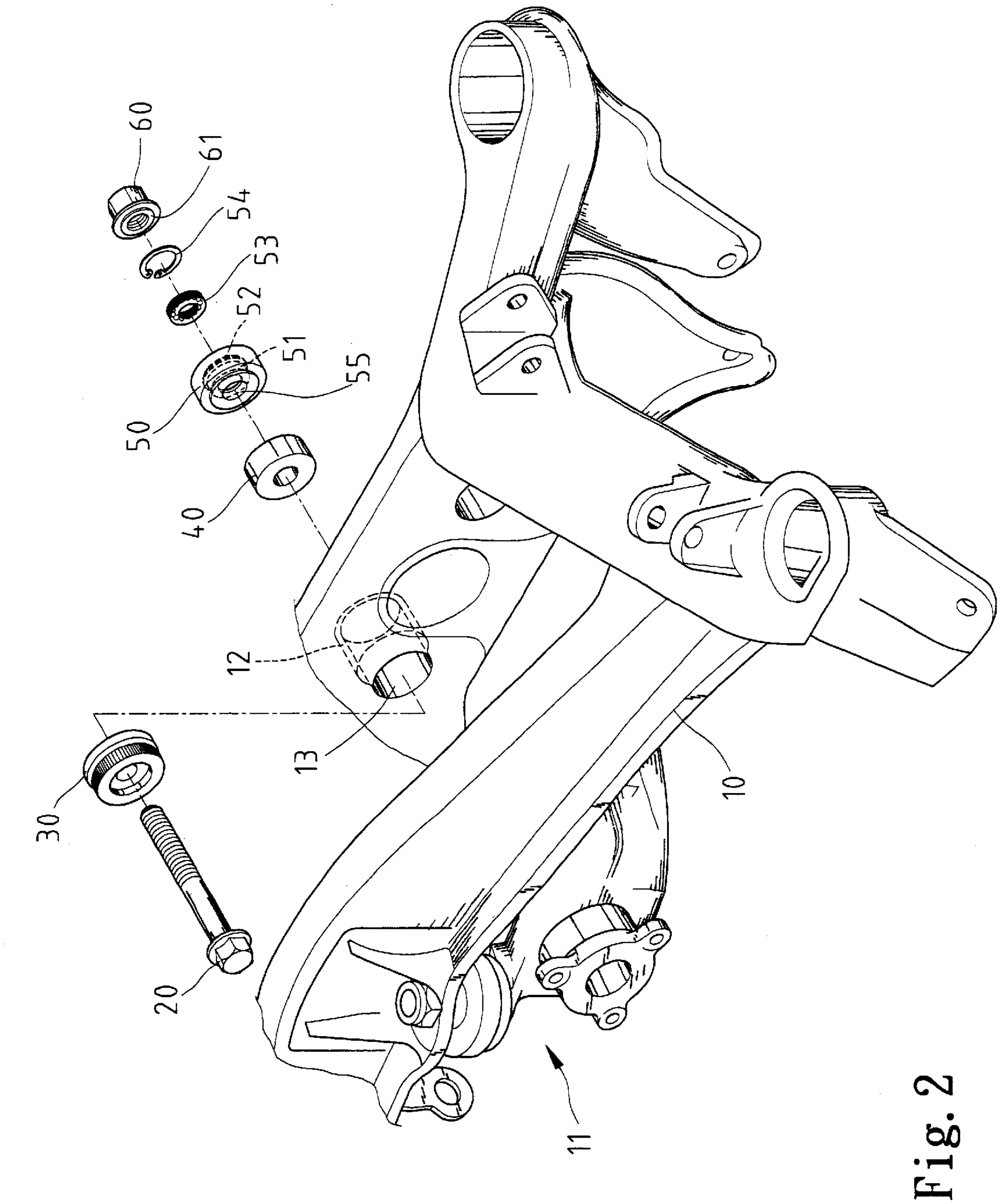
FIG. 2 is a perspective view of the chassis in FIG. 1, wherein elements of the tool kit for mounting the iron sleeve are shown in an exploded manner.

Referring to FIGS. 1 and 2, a tool kit in accordance with the present invention is provided for mounting/detaching an iron sleeve 40 to/from a vehicle chassis 10 without detaching the differential 11.

FIG. 2 shows a first embodiment of the tool kit in accordance with the present invention. A lug 12 directly projects from a side of the chassis 10. The tool kit includes a bolt 20, a pressing member 30 (for mounting the iron sleeve 40), a push-in member 50 (for mounting the iron sleeve 40), a nut 60, a pressing member 30' (for detaching the iron sleeve 40), and a detaching sleeve 70 (for detaching the iron sleeve 40).

Figure 3:
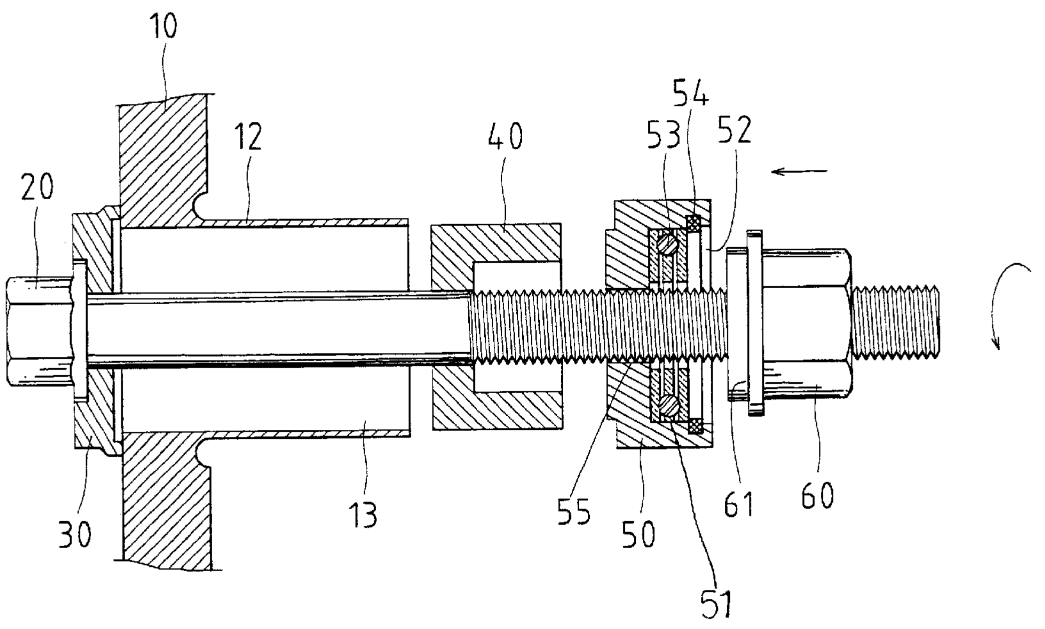
FIG. 3 is a sectional view illustrating mounting of the iron sleeve to the chassis.

As illustrated in FIG. 3, the lug 12 includes a receiving hole 13 that extends to the other side of the chassis 10. The iron sleeve 40 is to be force-fitted into the receiving hole 13. The pressing member 30 includes an outer diameter greater than an inner diameter of the receiving hole 13. The push-in member 50 includes a longitudinal through-hole 55 and a compartment 51 defined in a side thereof that faces away from the first-mentioned side of the chassis 10 when in use. A bearing 53 is mounted in the compartment 51 and retained in place by a retainer, e.g., a C-clip 54, leaving a residual compartment 52 for receiving a side 61 of the nut 60.

Figure 5:
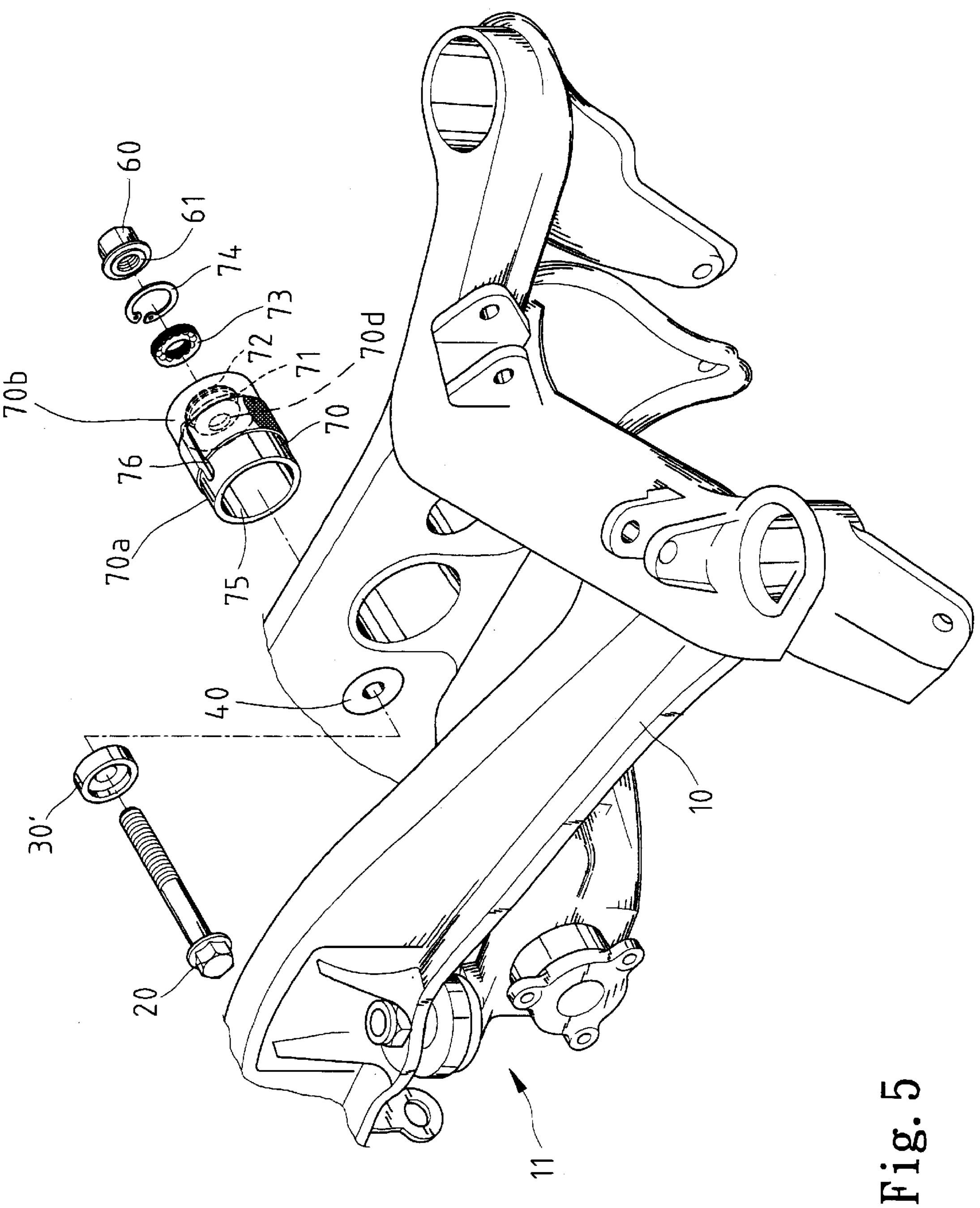
FIG. 5 is a perspective view of the chassis, illustrating the elements of the tool kit for detaching the iron sleeve.
Figure 6:
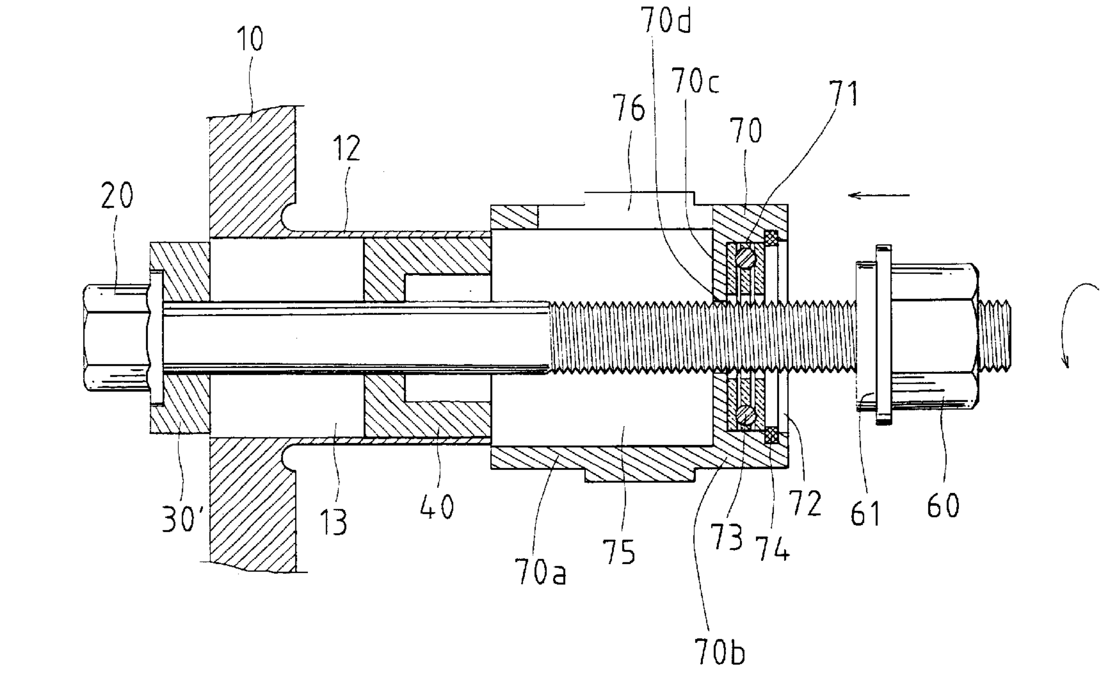
FIG. 6 is a sectional view illustrating detachment of the iron sleeve from the chassis by the elements of the tool kit in FIG. 5.

As illustrated in FIGS. 5 and 6, the detaching sleeve 70 includes a first sleeve portion **70*a* and a second sleeve portion 70*b* that are separated by a separation wall 70*c* having a bore 70*d* through which the shank of the bolt 20 extends. The first sleeve portion 70*a* includes a compartment 75 for receiving the iron sleeve 40 and the pressing member 30', which will be described later. The first sleeve portion 70*a* further includes a slot 76 such that the worker may check if the iron sleeve 40 has been completely moved out of the lug 12. The second sleeve portion 70*b* includes a compartment 71 defined in a side thereof that faces away from the first-mentioned side of the chassis 10 when in use. A bearing 73 is mounted in the compartment 71 and retained in place by a retainer, e.g., a C-clip 74, leaving a residual compartment 72 for receiving a side 61 of the nut 60**.

Figure 4:
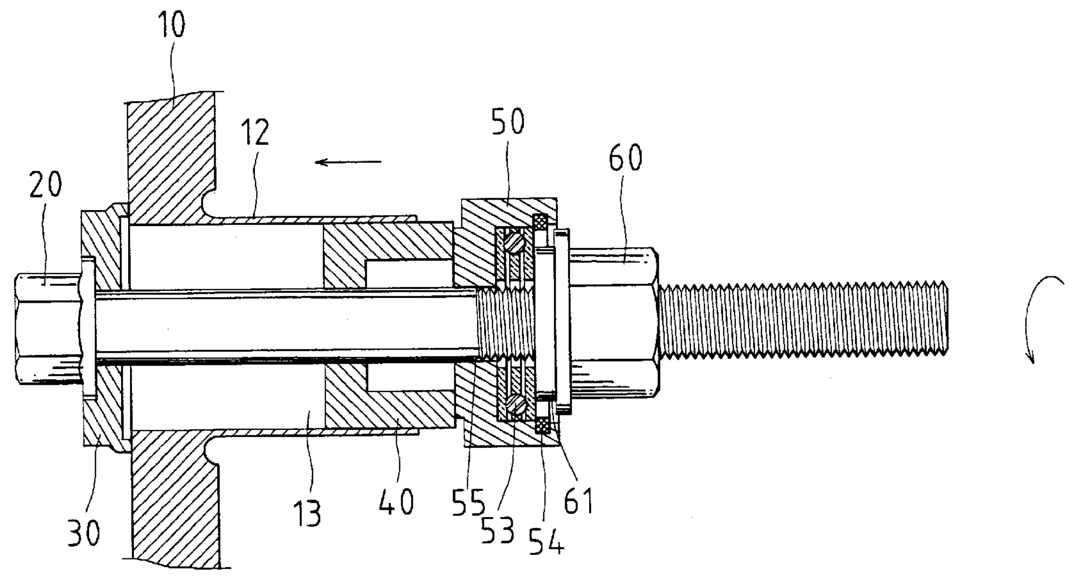
FIG. 4 is a sectional view similar to FIG. 3, wherein the iron sleeve is being mounted into a lug of the chassis.
Figure 4A:
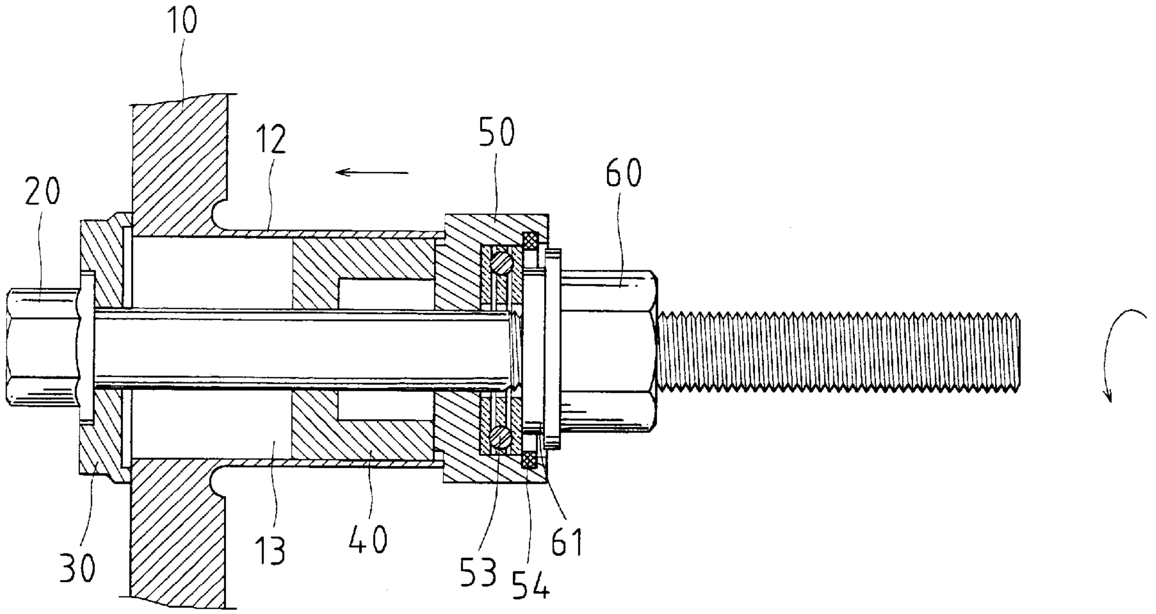
FIG. 4A is a sectional view similar to FIG. 4, wherein the iron sleeve has been mounted into the lug of the chassis.

When mounting the iron sleeve 40 into the lug 12 of the chassis 10, as illustrated in FIG. 3, the pressing member 30 is attached to the other side of the chassis 10 and the bolt 20 is extended through the pressing member 30 and the lug 12 with a bolt heal (not labeled) of the bolt 20 pressing against the pressing member 30. Then, the iron sleeve 40 and the push-in member 50 are mounted around a shank (not labeled) of the bolt 20. Next, the nut 60 is mounted on the threaded portion of the shank of the bolt 20 and rotated until the side 61 of the former is moved into the residual compartment 52 of the push-in member 50 and thus presses against the bearing 53 in the push-in member 50. As illustrated in FIGS. 4 and 4A, the iron sleeve 40 is moved into the lug 12 of the chassis 10 under rotational movement of the nut 60 that drives the push-in member 50 and the iron sleeve 40 to move along a longitudinal direction of the bolt 20. The bearing 53 avoids direct contact between the push-in member 50 and the nut 60 and allows easy rotation of the nut 60 for driving the iron sleeve 40 into the lug 12 of the chassis 10.

Figure 7:
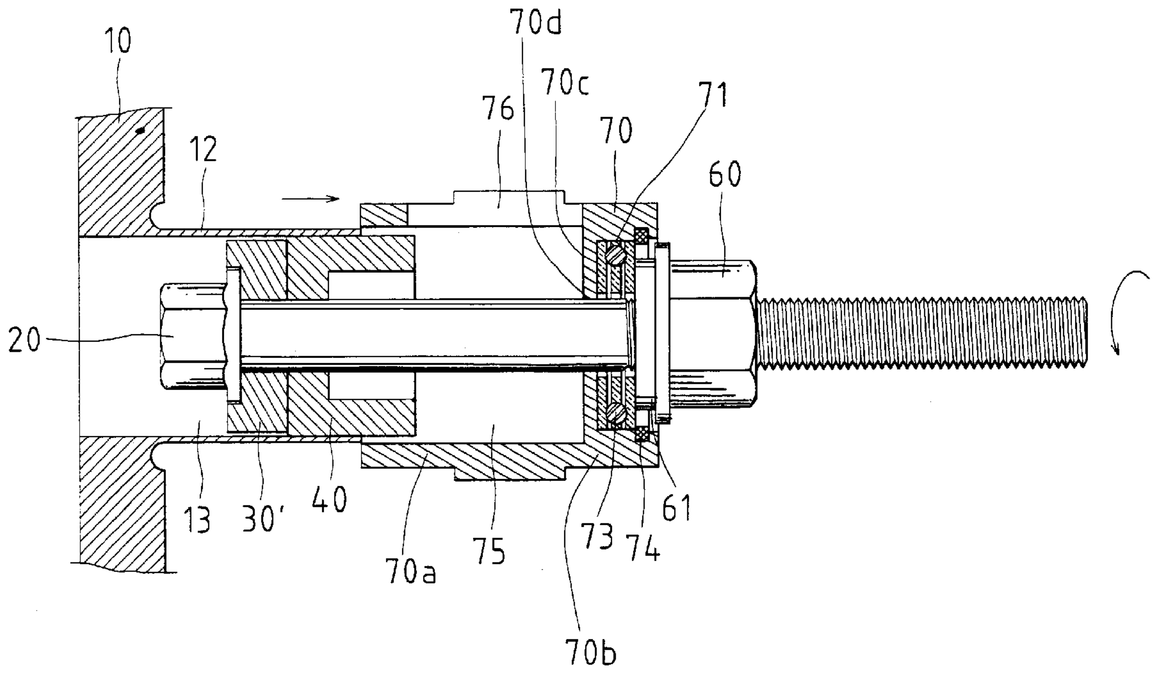
FIG. 7 is a sectional view similar to FIG. 6, wherein the iron sleeve has been detached from the chassis.

When the iron sleeve 40 is damaged or worn out, it has to be removed and replaced with a new one. Referring to FIG. 6, after the bolt 20 is removed, the pressing member 30 is replaced with the pressing member 30' that has an outer diameter smaller than the inner diameter of the lug 12. In addition, the detaching sleeve 70 is mounted around the shank of the bolt 20 before mounting the nut 60 onto the threaded portion of the shank of the bolt 20. The nut 60 is rotated until the side 61 of the former is moved into the residual compartment 72 of the detaching sleeve 70 and thus presses against the bearing 73 in the detaching sleeve 70. As illustrated in FIGS. 6 and 7, the pressing member 30' and the bolt head 20 are moved toward the iron sleeve 40 during rotation of the nut 60 until the pressing member 30' presses against the iron sleeve 40. Further rotation of the nut 60 causes the iron sleeve 40 and the pressing member 30' to move out of the lug 12 of the chassis 10 and into the compartment 75 of the first sleeve portion **70*a*. The bearing 73 avoids direct contact between the detaching sleeve 70 and the nut 60 and allows easy rotation of the nut 60 for driving the iron sleeve 40 out of the lug 12 of the chassis 10. The worker may check whether the iron sleeve 40 is completely moved out of the lug 12 of the chassis 10**.

Figure 8:
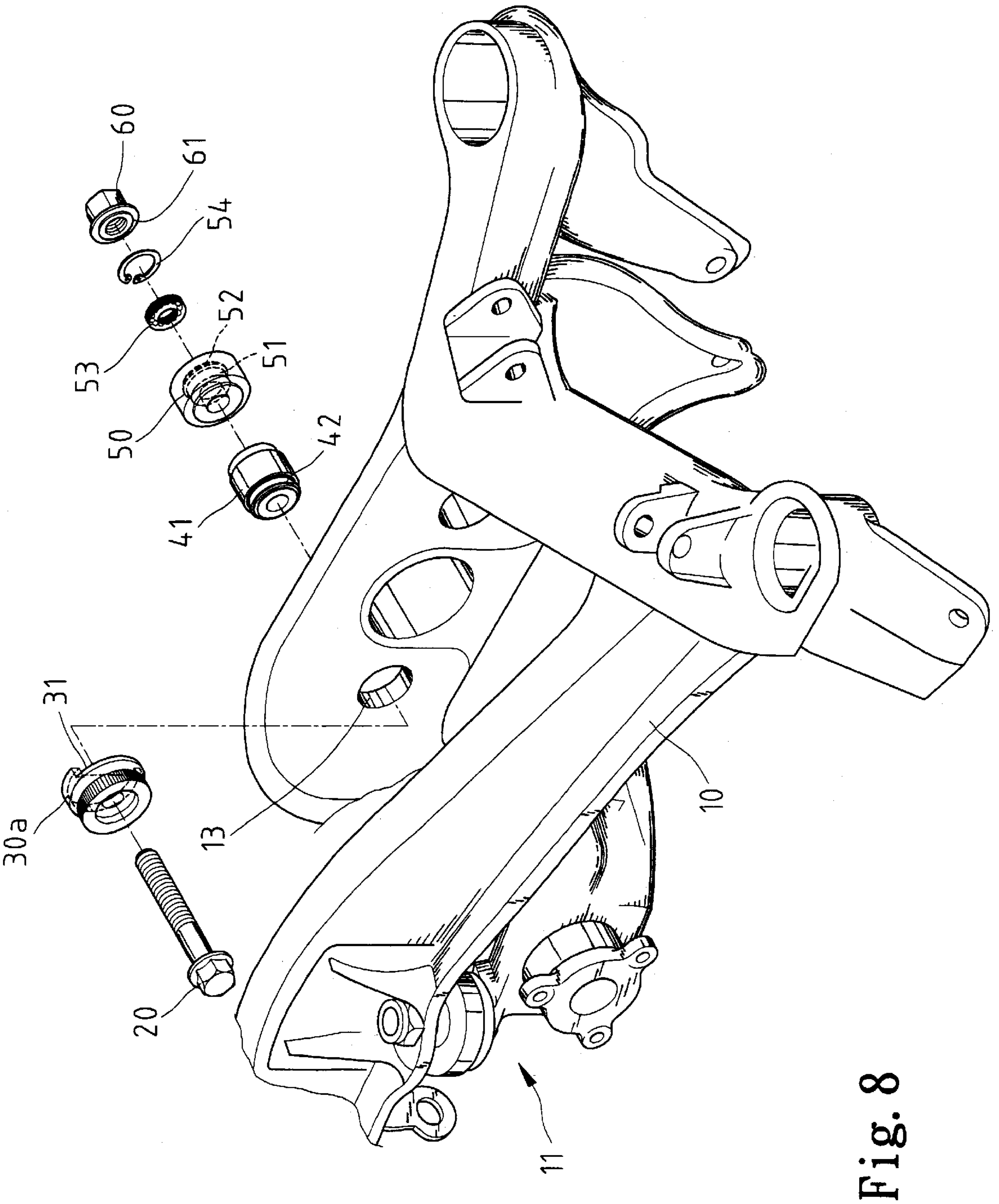
FIG. 8 is a perspective view, partly exploded, of a chassis with a second embodiment of the tool kit in accordance with the present invention, wherein only the elements of the tool kit for mounting the iron sleeve are shown.

FIG. 8 illustrates a modified embodiment of tool kit for a vehicle chassis having an iron sleeve 41 of the type having a soft rubber 42 on each of two sides thereof. The chassis 10 in this embodiment has a smaller space for mounting the iron sleeve 41 and includes a lug 12' having a receiving hole 13 for receiving the iron sleeve 41. The pressing member **30*a* in this embodiment includes a cutout 31 in response to limited space of the chassis 10**. The other elements of the modified embodiment are identical to those of the first embodiment.

Figure 9:
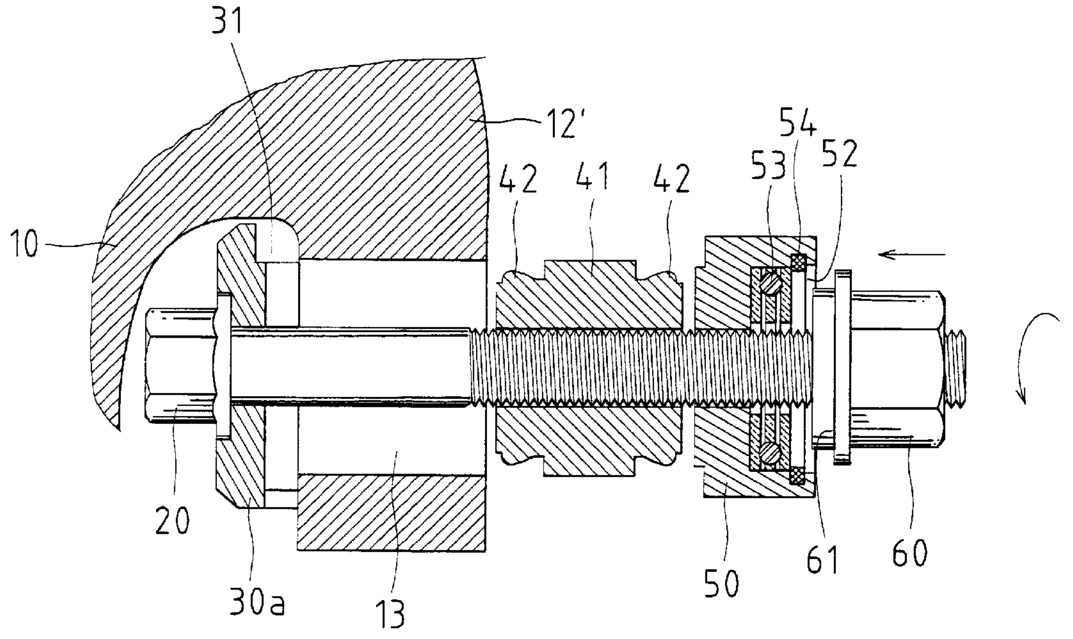
FIG. 9 is a sectional view illustrating mounting of the iron sleeve to the chassis by elements of the tool kit in FIG. 8.
Figure 10:
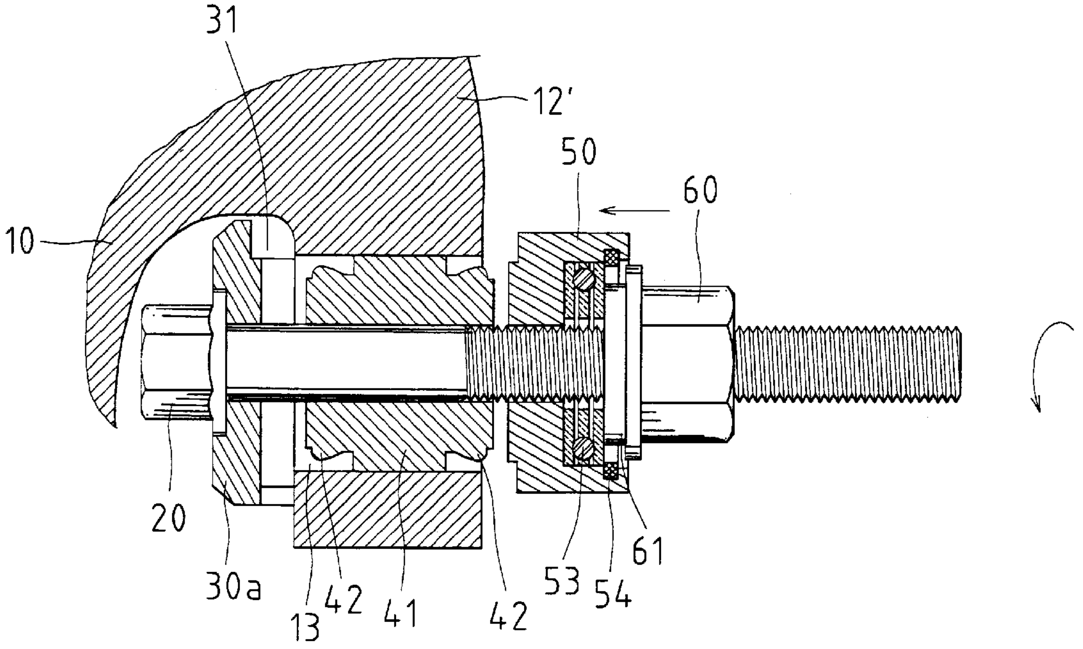
FIG. 10 is a sectional view similar to FIG. 9, wherein the iron sleeve is being mounted into a lug of the chassis.
Figure 10A:
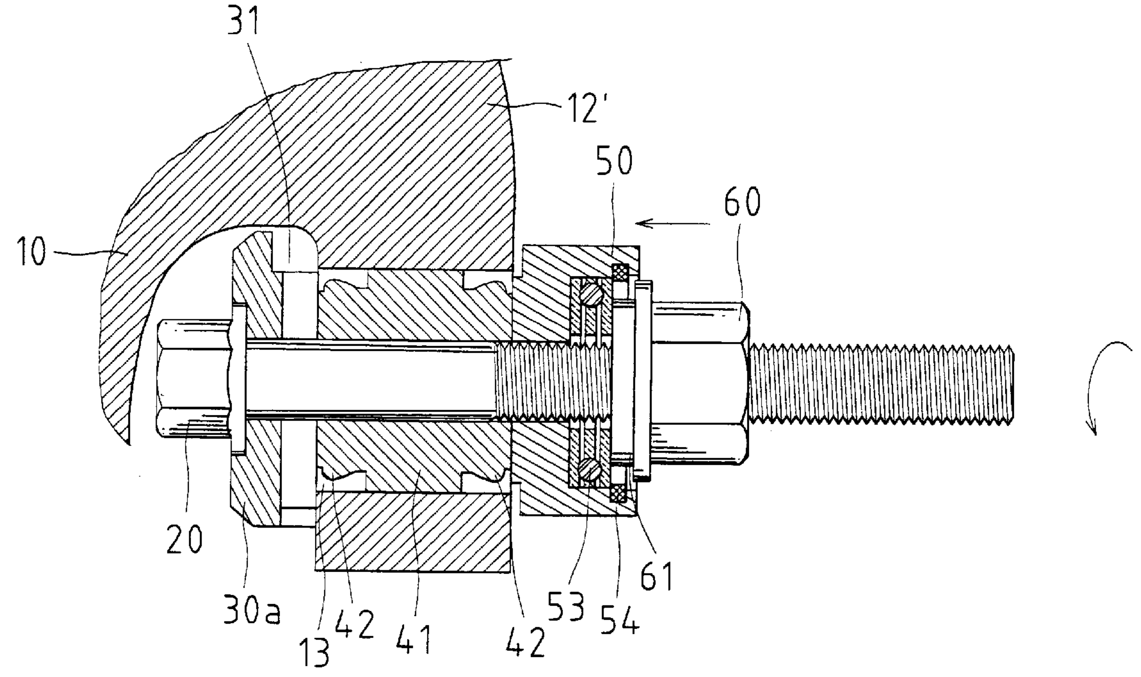
FIG. 10A is a sectional view similar to FIG. 10, wherein the iron sleeve has been mounted into the lug of the chassis.
Figure 11:
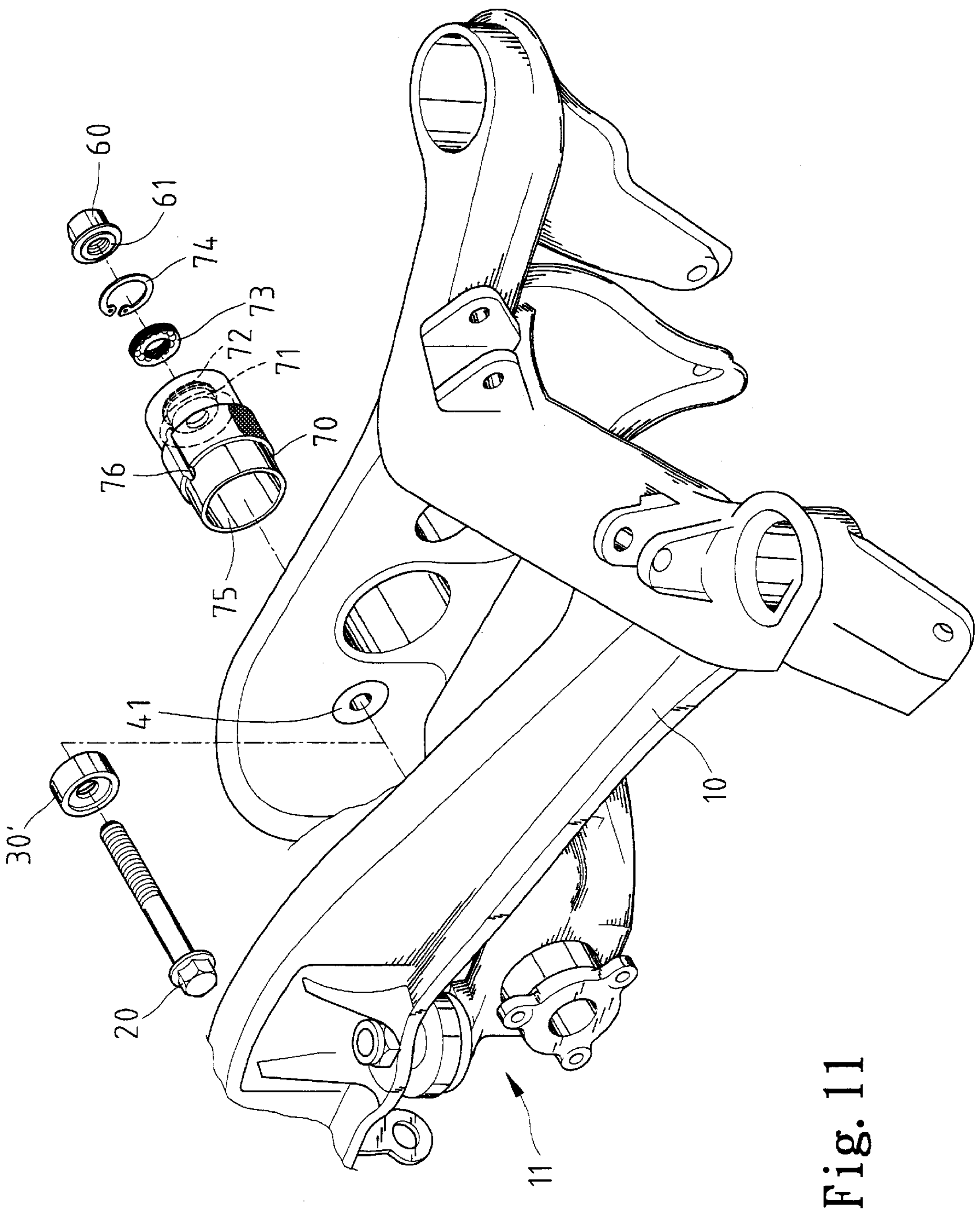
FIG. 11 is a perspective view of the chassis, illustrating elements of the tool kit of the second embodiment for detaching the iron sleeve.
Figure 12:
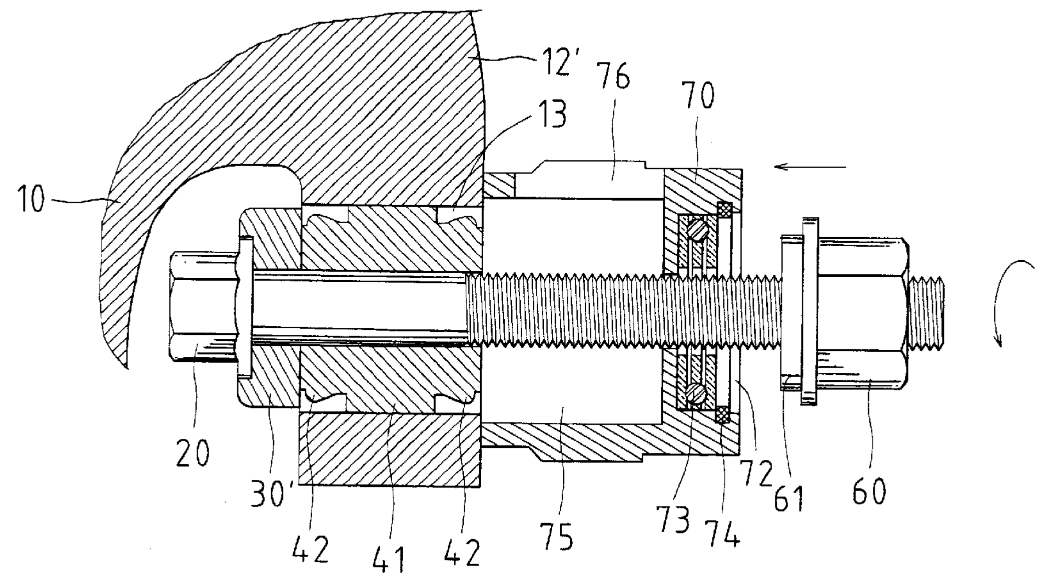
FIG. 12 is a sectional view illustrating detachment of the iron sleeve from the chassis by the elements of the tool kit in FIG. 11.
Figure 13:
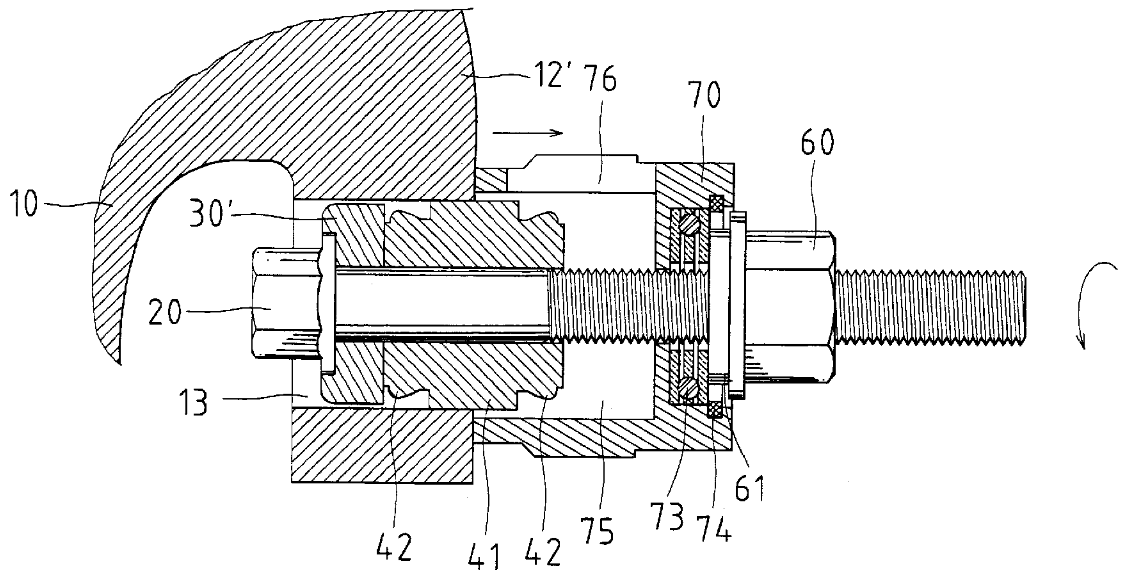
FIG. 13 is a sectional view similar to FIG. 12, wherein the iron sleeve has been detached from the chassis.
Figure 14:
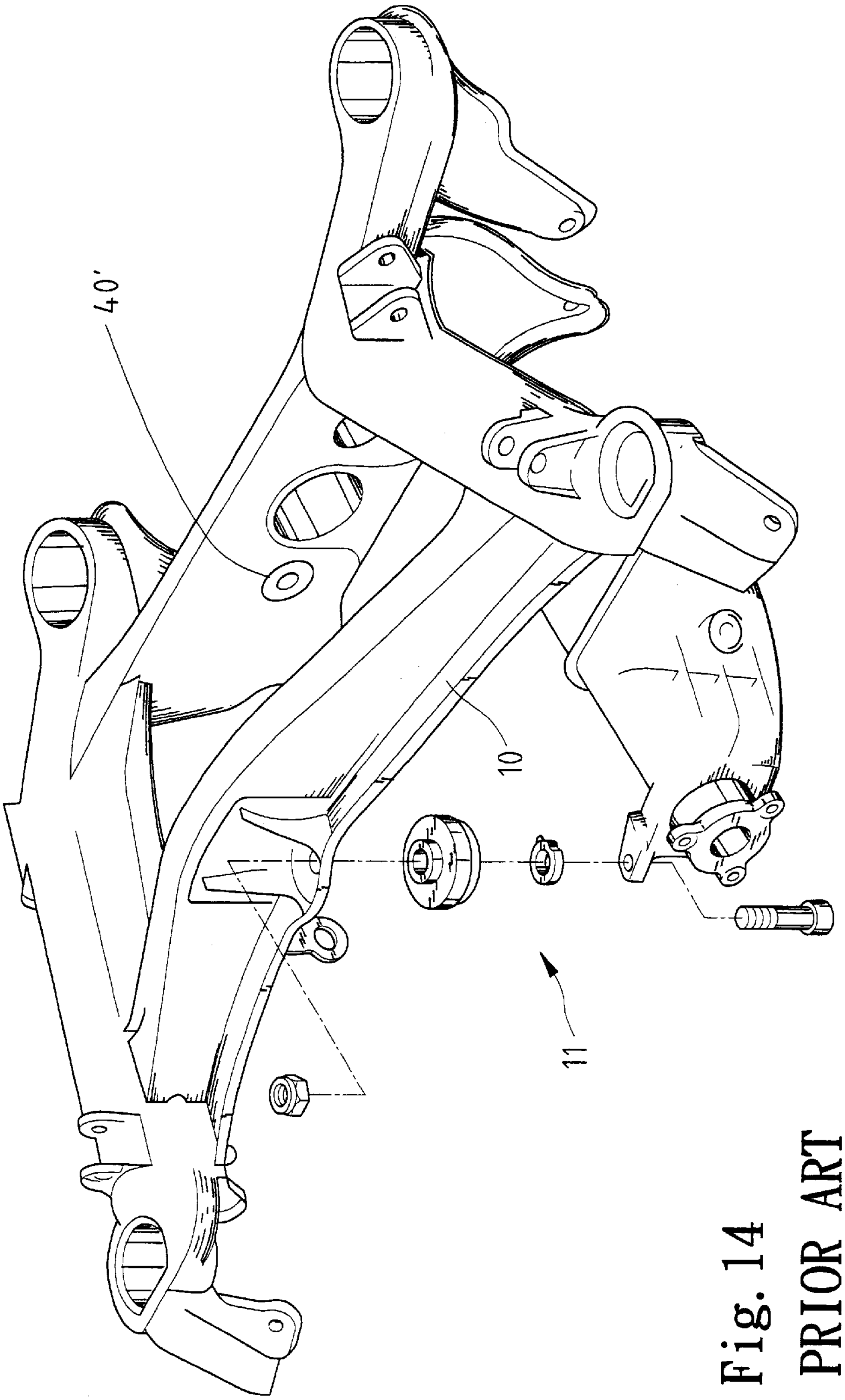
Fig. 14 PRIOR ART
FIG. 14 is a perspective view, partly exploded, of a conventional chassis.

FIGS. 9, 10, and 10A illustrates mounting (force-fitting) of the iron sleeve 41 into the receiving hole 13 of the lug 12' of the chassis 10. FIG. 11 illustrates the elements of the tool kit for detaching the iron sleeve 41 from the chassis 10. FIGS. 12 and 13 illustrate removal of the iron sleeve 41 out of the receiving hole 13 of the lug 12' of the chassis 10. The mounting operation and the detaching operation of this modified embodiment are identical to those for the first embodiment and therefore not described in detail to avoid redundancy.

Although the invention has been explained in relation to its preferred embodiment, it is to be understood that many other possible modifications and variations can be made without departing from the scope of the invention as hereinafter claimed.

What is claimed is:

1. A tool kit for a chassis having a first compartment defined therein for receiving an iron sleeve, the chassis including a first side and a second side, the tool kit comprising:

a pressing member for mounting the iron sleeve into the compartment of the chassis, the pressing member having an outer diameter greater than an inner diameter of the compartment of the chassis;

a bolt including a bolt head and a shank;

a push-in member for mounting the iron sleeve into the compartment of the chassis;

a nut, wherein when mounting the iron sleeve into the compartment of the chassis, the pressing member is attached to the first side of the chassis, the bolt is extended through the pressing member and the compartment of the chassis with the bolt head pressing against the pressing member, the iron sleeve and the push-in member are mounted around the shank of the bolt, and the nut is mounted around the shank of the bolt and rotated to drive the push-in member to move along a longitudinal direction of the bolt, which, in turn, drives the iron sleeve into the compartment of the chassis, wherein the push-in member includes a longitudinal hole through which the shank of the bolt extends, the push-in member further including a second compartment defined in a side thereof that faces away from the second side of the chassis when in use; and a bearing being mounted in the second compartment to which the nut presses against, thereby allowing easy rotation of the nut.

2. The tool kit as claimed in claim 1, wherein the bearing is retained in place by a C-clip.

3. The tool kit as claimed in claim 2, wherein a residual compartment is left in the push-in member after the bearing and the C-clip are mounted into the second compartment.

4. The tool kit as claimed in claim 3, wherein the nut includes a side that is received in the residual compartment.

5. A tool kit for a chassis having a first compartment defined therein for receiving an iron sleeve, the chassis including a first side and a second side, the tool kit comprising:

a pressing member for removing the iron sleeve out of the compartment of the chassis, the pressing member having an outer diameter smaller than an inner diameter of the compartment of the chassis;

a bolt including a bolt head and a shank;

a push-in member for mounting the iron sleeve into the compartment of the chassis;

a nut; and a detaching sleeve for removing the iron sleeve out of the first compartment of the chassis, wherein when removing the iron sleeve out of the compartment of the chassis, the pressing member is attached to the first side of the chassis, the bolt is extended through the pressing member and the compartment of the chassis with the bolt head pressing against the pressing member, the iron sleeve and the detaching sleeve are mounted around the shank of the bolt, and the nut is mounted around the shank of the bolt and rotated to drive the pressing member to move along a longitudinal direction of the bolt, which, in turn, drives the iron sleeve out of the compartment of the chassis and into the detaching sleeve, wherein the detaching sleeve includes a first sleeve portion and a second sleeve portion that are separated by a separation wall having a bore through which the shank of the bolt extends, the first sleeve portion including a second compartment for receiving the iron sleeve and the pressing member during removal of the iron sleeve.

6. The tool kit as claimed in claim 5, wherein the second sleeve portion of the detaching sleeve includes a third compartment, a bearing being mounted in the third compartment to which the nut presses against, thereby allowing easy rotation of the nut.

7. The tool kit as claimed in claim 6, wherein the bearing is residual in place by a C-clip.

8. The tool kit as claimed in claim 7, wherein a residual compartment is left in the detaching sleeve after the bearing and the C-clip are mounted into the third compartment.

9. The tool kit as claimed in claim 8, wherein the nut includes a side that is received in the residual compartment.

10. The tool kit as claimed in claim 6, further comprising:

a second pressing member for mounting the iron sleeve into the compartment of the chassis, the second pressing member having an outer diameter greater than the inner diameter of the compartment of the chassis; and a push-in member for mounting the iron sleeve into the compartment of the chassis, wherein when mounting the iron sleeve in the compartment of the chassis, the second pressing member is attached to the first side of the chassis, the bolt is extended through the second pressing member and the compartment of the chassis with the bolt head pressing against the second pressing member, the iron sleeve and the push-in member are mounted around the shank of the bolt, and the nut is mounted around the shank of the bolt and rotated to drive the push-in member to move along the longitudinal direction of the bolt, which, in turn, drives the iron sleeve into the compartment of the chassis.

11. The tool kit as claimed in claim 2, further comprising:

a second pressing member for removing the iron sleeve out of the compartment of the chassis, the second pressing member having an outer diameter smaller than the inner diameter of the compartment of the chassis; and a detaching sleeve for removing the iron sleeve out of the compartment of the chassis, wherein when removing the iron sleeve out of the compartment of the chassis, the second pressing member is attached to the first side of the chassis, the bolt is extended through the second pressing member and the compartment of the chassis with the bolt head pressing against the second pressing member, the iron sleeve and the detaching sleeve are mounted around the shank of the bolt, and the nut is mounted around the shank of the bolt and rotated to drive the second pressing member to move along the longitudinal direction of the bolt, which, in turn, drives the iron sleeve out of the compartment of the chassis and into the detaching sleeve.

* * * * *